United States Patent
Underwood et al.

(10) Patent No.: US 9,393,648 B2
(45) Date of Patent: Jul. 19, 2016

(54) UNDERCUT STATOR FOR A POSITIVE DISPLACMENT MOTOR

(75) Inventors: Lance D. Underwood, Morrison, CO (US); William D. Murray, Tomball, TX (US); Thomas K. Washburn, Cypress, TX (US)

(73) Assignee: SMITH INTERNATIONAL INC., Houston, TX (US)

( * ) Notice: Subject to any disclaimer, the term of this patent is extended or adjusted under 35 U.S.C. 154(b) by 1548 days.

(21) Appl. No.: 12/749,828

(22) Filed: Mar. 30, 2010

(65) Prior Publication Data
US 2011/0243774 A1    Oct. 6, 2011

(51) Int. Cl.
| | |
|---|---|
| F01C 1/10 | (2006.01) |
| B23P 15/00 | (2006.01) |
| B21K 21/12 | (2006.01) |
| B23H 3/04 | (2006.01) |
| B23H 9/00 | (2006.01) |
| F03C 2/08 | (2006.01) |
| F04C 2/107 | (2006.01) |
| F04C 13/00 | (2006.01) |

(52) U.S. Cl.
CPC .............. B23P 15/00 (2013.01); B21K 21/12 (2013.01); B23H 3/04 (2013.01); B23H 9/003 (2013.01); F03C 2/08 (2013.01); F04C 2/1075 (2013.01); F04C 13/008 (2013.01); F04C 2230/101 (2013.01); Y10T 29/49229 (2015.01)

(58) Field of Classification Search
CPC .......... B23P 15/00; B21K 21/12; B23H 3/04; B23H 9/003; F03C 2/08; F04C 2/1075; F04C 12/008; F04C 2230/101; Y10T 29/49229

USPC ................ 418/48, 153, 220, 49–53, 152, 156
See application file for complete search history.

(56) References Cited

U.S. PATENT DOCUMENTS

| | | | |
|---|---|---|---|
| 2,464,011 A * | 3/1949 | Wade | ............................. 418/48 |
| 2,527,673 A | 10/1950 | Byram | |
| 3,084,631 A | 4/1963 | Bourke | |
| 3,139,035 A | 6/1964 | O'Connor | |
| 3,417,664 A | 12/1968 | Brucker | |
| 3,499,389 A | 3/1970 | Seeberger et al. | |
| 3,822,972 A | 7/1974 | Ogly et al. | |
| 3,840,080 A | 10/1974 | Berryman | |

(Continued)

FOREIGN PATENT DOCUMENTS

| | | |
|---|---|---|
| DE | 1528978 A1 | 7/1969 |
| DE | 2713468 | 9/1982 |

(Continued)

OTHER PUBLICATIONS

International Preliminary Report on Patentability and Written Opinion for International Application No. PCT/US2011/030506 dated Oct. 21, 2011.

*Primary Examiner* — Thomas Denion
*Assistant Examiner* — Thomas Olszewski

(57) ABSTRACT

A Moineau style stator includes a stator tube having a plurality of rigid helical lobes formed on an inner surface thereof. The helical lobes define a major internal tube diameter that is greater than a pass through diameter of the tube such that the major diameter undercuts the pass through diameter of the tube. A major liner diameter may also be less than the pass through diameter so as to provide a suitable interference fit between rotor and stator.

5 Claims, 4 Drawing Sheets

(56) References Cited

U.S. PATENT DOCUMENTS

| | | |
|---|---|---|
| 3,857,654 A | 12/1974 | Steicher |
| 3,912,426 A | 10/1975 | Tschirky |
| 3,975,120 A | 8/1976 | Tschirky |
| 3,975,121 A | 8/1976 | Tschirky |
| 4,104,009 A | 8/1978 | Chanton |
| 4,144,001 A | 3/1979 | Steicher |
| 4,265,323 A | 5/1981 | Juergens |
| 4,415,316 A | 11/1983 | Jurgens |
| 4,558,991 A | 12/1985 | Barr |
| 4,614,232 A | 9/1986 | Jurgens et al. |
| 4,636,151 A | 1/1987 | Eppink |
| 4,676,725 A | 6/1987 | Eppink |
| 4,718,824 A | 1/1988 | Cholet et al. |
| 4,991,292 A | 2/1991 | Bostel |
| 5,064,889 A | 11/1991 | Ikeno |
| 5,090,497 A * | 2/1992 | Beimgraben et al. .......... 175/107 |
| 5,139,400 A * | 8/1992 | Ide .................................. 418/48 |
| 5,145,342 A | 9/1992 | Gruber |
| 5,171,138 A | 12/1992 | Forrest |
| 5,171,139 A | 12/1992 | Underwood et al. |
| 5,257,967 A | 11/1993 | Gysin |
| 5,439,359 A | 8/1995 | Leroy et al. |
| 5,474,432 A | 12/1995 | Hulley et al. |
| 5,700,888 A | 12/1997 | Hall |
| 5,759,019 A | 6/1998 | Wood et al. |
| 5,832,604 A | 11/1998 | Johnson et al. |
| 6,019,583 A | 2/2000 | Wood |
| 6,102,681 A | 8/2000 | Turner |
| 6,183,226 B1 | 2/2001 | Wood et al. |
| 6,190,771 B1 | 2/2001 | Chen et al. |
| 6,224,526 B1 | 5/2001 | Stimmelmayr et al. |
| 6,241,494 B1 | 6/2001 | Pafitis et al. |
| 6,293,358 B1 | 9/2001 | Jager |
| 6,309,195 B1 | 10/2001 | Bottos et al. |
| 6,336,796 B1 | 1/2002 | Cholet et al. |
| 6,413,417 B1 | 7/2002 | Yamasaki et al. |
| 6,427,787 B1 * | 8/2002 | Jager ............................ 175/107 |
| 6,543,132 B1 | 4/2003 | Krueger et al. |
| 6,568,076 B2 | 5/2003 | Bottos et al. |
| 6,604,921 B1 | 8/2003 | Plop et al. |
| 6,604,922 B1 | 8/2003 | Hache |
| 6,881,045 B2 * | 4/2005 | Zitka et al. ....................... 418/48 |
| 6,935,995 B2 | 8/2005 | Siebert et al. |
| 6,944,935 B2 | 9/2005 | Hache |
| 7,083,010 B2 * | 8/2006 | Eppink et al. ............... 175/325.2 |
| 7,083,401 B2 | 8/2006 | Hooper |
| 7,192,260 B2 * | 3/2007 | Lievestro et al. ............... 418/48 |
| 7,396,220 B2 * | 7/2008 | Delpassand et al. ........... 418/48 |
| 2005/0079083 A1 | 4/2005 | Lievestro et al. |
| 2005/0089429 A1 | 4/2005 | Delpassand et al. |
| 2005/0118040 A1 * | 6/2005 | Zitka et al. .................. 417/410.4 |
| 2005/0263289 A1 | 12/2005 | Kanady et al. |
| 2006/0029507 A1 | 2/2006 | Kaiser et al. |
| 2006/0182643 A1 * | 8/2006 | Delpassand et al. ........... 418/45 |
| 2008/0310981 A1 * | 12/2008 | Wiedenhoefer et al. ........ 418/48 |
| 2009/0169404 A1 | 7/2009 | Sindt et al. |
| 2010/0038142 A1 | 2/2010 | Snyder et al. |

FOREIGN PATENT DOCUMENTS

| | | |
|---|---|---|
| DE | 3503604 A1 | 8/1986 |
| DE | 4006339 C2 | 8/1991 |
| DE | 19531318 A1 | 2/1997 |
| EP | 0358789 A | 3/1990 |
| GB | 2081812 A | 2/1982 |
| WO | 0144615 | 6/2001 |
| WO | 2009052112 A2 | 7/2009 |

* cited by examiner

UNDERCUT STATOR FOR A POSITIVE DISPLACMENT MOTOR

RELATED APPLICATIONS

None.

FIELD OF THE INVENTION

The present invention relates generally to Moineau style drilling motors and pumps, typically for downhole use. This invention more specifically relates to Moineau style stators having a rigid internal helical profile.

BACKGROUND OF THE INVENTION

Moineau style hydraulic motors and pumps are conventional in subterranean drilling and artificial lift applications, such as for oil and/or gas exploration. Such motors make use of hydraulic power from drilling fluid to provide torque and rotary power, for example, to a drill bit assembly. The power section of a typical Moineau style motor includes a helical rotor disposed within the helical cavity of a corresponding stator. When viewed in transverse cross section, a typical stator shows a plurality of lobes in the helical cavity. In most conventional Moineau style power sections, the rotor lobes and the stator lobes are preferably disposed in an interference fit, with the rotor including one fewer lobe than the stator. Thus, when fluid, such as a conventional drilling fluid, is passed through the helical spaces between rotor and stator, the flow of fluid causes the rotor to rotate relative to the stator (which may be coupled, for example, to a drill string). The rotor may be coupled, for example, through a universal connection and an output shaft to a drill bit assembly.

Conventional stators commonly include a helical cavity component bonded to an inner surface of a steel tube. The helical cavity component in such conventional stators typically includes an elastomer (e.g., rubber) and provides a resilient surface with which to facilitate the interference fit with the rotor. Many stators are known in the art in which the helical cavity component is made substantially entirely of a single elastomer layer.

It has been observed that during drilling operations, the elastomer portions of conventional stator lobes are subject to considerable cyclic deflection, due at least in part to the interference fit with the rotor and reactive torque from the rotor. Such cyclic deflection is well known to cause a significant temperature rise in the elastomer. In conventional stators, especially those in which the helical cavity component is made substantially entirely from a single elastomer layer, the greatest temperature rise often occurs at or near the center of the helical lobes. The temperature rise is known to degrade and embrittle the elastomer, eventually causing cracks, cavities, and other types of failure in the lobes. Such elastomer degradation is known to reduce the expected operational life of the stator and necessitate premature replacement thereof. Left unchecked, degradation of the elastomer will eventually undermine the seal between the rotor and stator (essentially destroying the integrity of the interference fit), which results in fluid leakage therebetween. The fluid leakage in turn causes a loss of drive torque and eventually may cause failure of the motor (e.g., stalling of the rotor in the stator) if left unchecked.

Stators including a rigid internal helical profile have been developed to address this problem. For example, U.S. Pat. No. 5,171,138 to Forrest and U.S. Pat. No. 6,309,195 to Bottos et al. disclose stators having helical cavity components in which a thin elastomer liner is deployed on the inner surface of a rigid, metallic stator former. The '138 patent discloses a rigid, metallic stator former deployed in a stator tube. The '195 patent discloses a "thick walled" stator having inner and outer helical stator profiles. The use of such "rigid" stators is disclosed to preserve the shape of the stator lobes during normal operations (i.e., to prevent lobe deformation) and therefore to improve stator efficiency and torque and power transmission. Moreover, such metallic stators are also disclosed to provide greater heat dissipation than conventional stators including elastomer lobes. While stators having rigid stator formers have been used commercially, there is room for further improvement.

SUMMARY OF THE INVENTION

The present disclosure addresses one or more of the above-described drawbacks of conventional Moineau style motors and pumps. Aspects of the present disclosure include a Moineau style stator for use in such motors and/or pumps, such as in a downhole drilling motor. The stator includes a stator tube (e.g., a steel tube) having a plurality of rigid helical lobes formed on an inner surface thereof. These helical lobes define a major internal tube diameter that is greater than a pass through diameter of the tube. As a result, the helical cavity in the stator tube undercuts the pass through diameter of the tube. In preferred embodiments, a major liner diameter is less than the pass through diameter so as to provide a suitable interference fit between rotor and stator. The present disclosure also includes methods for fabricating stators in accordance with the present disclosure.

Exemplary embodiments of the present disclosure advantageously provide several technical advantages. In particular, embodiments of the present disclosure provide for increased power and torque per unit stator length as compared to prior art stators in which the major internal tube diameter is less than the pass through diameter. The present disclosure also enables the use of increased liner thickness without loss of power or torque.

In one aspect, the present disclosure includes a Moineau style stator. The stator includes an integral stator tube having a longitudinal end with an internal pass through diameter. The stator tube defines an internal helical cavity and further includes a plurality of internal rigid helical lobes formed on an inner surface of the tube. The helical cavity has a major internal tube diameter that is greater than the pass through diameter of the longitudinal end.

In another aspect, the present disclosure includes a method for fabricating a Moineau style stator. A stator tube having at least one longitudinal end having a first pass through diameter is provided. A helical profile is formed on an inner surface of the tube, the helical profile including a plurality of rigid internal helical lobes and a major internal tube diameter that is less than the first pass through diameter. At least one longitudinal end of the stator tube is mechanically worked so as to reduce outer and inner diameters of the end such that the end has a second pass through diameter, the second pass through diameter being less than the major internal tube diameter formed on the inner surface of the tube.

In still another aspect, the present disclosure includes a method for fabricating a Moineau style stator. A stator tube is provided having at least one longitudinal end with a pass through diameter. The stator tube further includes an internal relief groove in which an inner diameter of the relief groove is greater than the pass through diameter. An electrochemical machining electrode is assembled in the relief groove. The electrode includes a plurality of distinct work pieces, each of the work pieces having an outer diameter less than the pass through diameter. The assembled electrode defines a major helical diameter greater than the pass through diameter. An internal helical profile is electrochemically machined in the stator tube using the assembled electrodes, the internal helical profile including a plurality of helical lobes and a major internal tube diameter that is greater than the pass through diameter of the longitudinal end. The electrodes are then disassembled and removed from the from the stator tube.

The foregoing has outlined rather broadly the features and technical advantages of the present disclosure in order that the detailed description of the present disclosure that follows may be better understood. Additional features and advantages of the present disclosure will be described hereinafter, which form the subject of the claims of the invention. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

FIG. 2 depicts a transverse cross-section through a Moineau style power section in an exemplary 4/5 design. In such a design, the differing helical configurations on the rotor and the stator provide, in transverse cross section, 4 lobes on the rotor and 5 lobes on the stator. It will be appreciated that this 4/5 design is depicted purely for illustrative purposes only, and that the present disclosure is in no way limited to any particular choice of helical configurations for the power section design.

Figure 1:
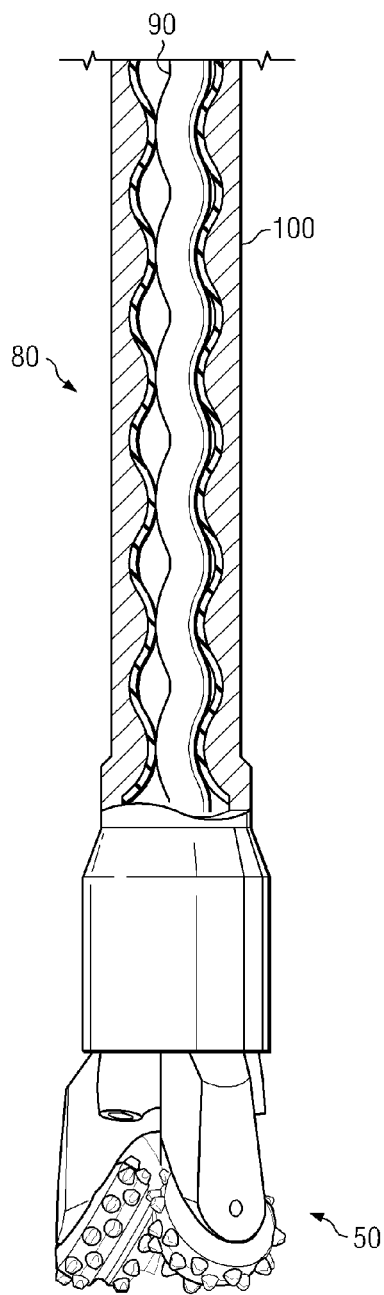
FIG. 1 depicts a conventional drill bit coupled to a Moineau style motor utilizing an exemplary stator embodiment of the present disclosure.

With reference now to FIG. 1, one exemplary embodiment of a Moineau style power section 80 according to the present disclosure is shown in use in a downhole drilling motor. Power section 80 includes a helical rotor 90 deployed in the helical cavity of Moineau style stator 100. In the embodiment shown on FIG. 1, the power section 80 is coupled to a drill bit assembly 50 in a configuration suitable, for example, for drilling a subterranean borehole, such as in an oil and/or gas formation. It will be understood that the Moineau style stator 100 of the present disclosure, while shown coupled to a drill bit assembly in FIG. 1, is not limited to downhole applications, but rather may be utilized in substantially any application in which Moineau style motors and/or pumps are used.

Figure 2A:
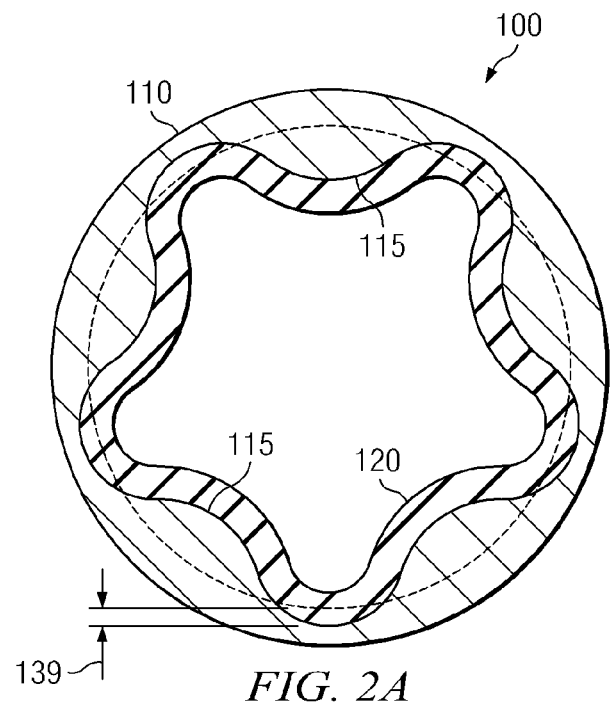
FIGS. 2A and 2B (collectively FIG. 2) depict transverse and longitudinal cross sectional views of the stator embodiment depicted on FIG. 1.
Figure 2B:
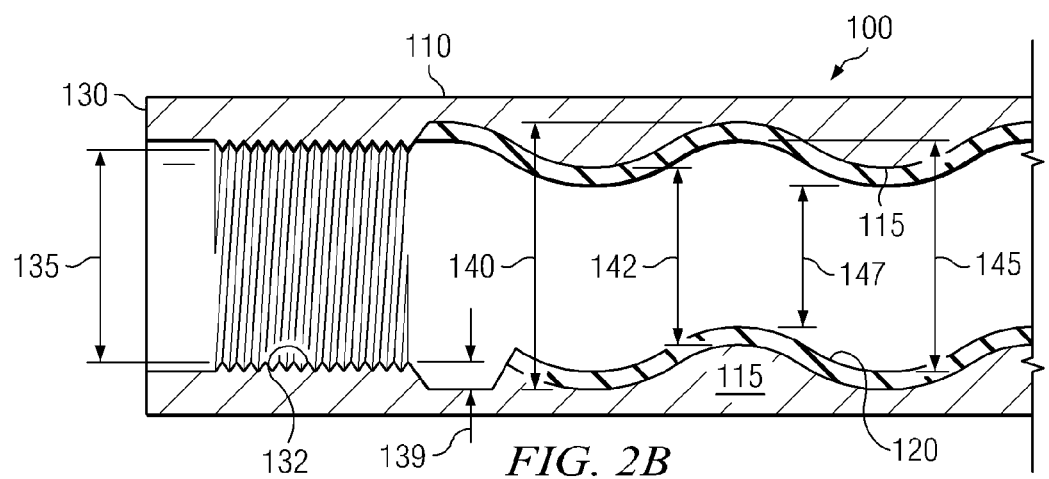

FIGS. 2A and 2B (collectively FIG. 2) depict transverse and longitudinal cross sections of the stator embodiment 100 depicted on FIG. 1. In the exemplary embodiment depicted, stator 100 includes an outer stator tube 110 (e.g., a steel tube) having a plurality of rigid helical lobes 115 formed on an inner surface thereof. Stator 100 further includes a resilient liner 120 deployed on an inner surface of the tube 110. The resilient liner 120 may be fabricated from, for example, substantially any suitable elastomer material. In exemplary applications for use downhole in oil and gas exploration, the elastomer material is advantageously selected in view of an expectation of being exposed to various oil based compounds and high service temperatures and pressures.

With continued reference to FIG. 2, stator 100 further includes a connecting end portion 130 configured to be connected to other drill string components. In the exemplary embodiment depicted, end portion 130 includes a threaded box end including internal threads 132 that define a pass through diameter 135. This inner diameter is referred to as a "pass-through" diameter because it defines the diameter through which internal components must pass through in order to be deployed in the stator.

The helical lobes 115 formed on the inner surface of the stator tube 110 define major and minor internal tube diameters. The major tube diameter 140 is the outermost (the largest) internal tube diameter and extends from trough to trough on the tube 110 as depicted on FIG. 2B. The minor tube diameter 142 is the innermost (the smallest) internal diameter and extends from lobe to lobe on the tube as also depicted on FIG. 2B. The resilient liner 120 defines major and minor internal liner diameters. The major liner diameter 145 is the outermost (the largest) internal liner diameter and extends from trough to trough on the liner 120. The minor liner diameter 147 is the innermost (the smallest) internal liner diameter and extends from lobe to lobe on the liner 120. The major and minor liner diameters are also depicted on FIG. 2B.

With continued reference to FIG. 2, stator embodiments in accordance with the present disclosure include a stator tube having a plurality of helical lobes 115 formed on an inner surface thereof in which the major internal tube diameter 140 is greater than the pass through diameter 135 of end portion 130. As depicted at 139 on FIG. 2B, the helical cavity of the stator tube undercuts the pass through diameter of the tube. Stators in accordance with the present disclosure may also preferably include a major liner diameter 145 that is less than the pass through diameter 135 so as to provide a suitable interference fit between rotor and stator. In preferred embodiments of the present disclosure, the stator 100 includes an integral stator tube, i.e., a one piece stator tube 110. An integral stator tube advantageously improves the strength and durability of the stator. By integral it is meant that the stator tube is formed from a single metallic work piece and may therefore be said to be of a unitary construction.

One aspect of the present disclosure is the realization that conventional fabrication techniques utilized to fabricate rigid stators (stators having a rigid internal helical profile) limit these stators to having a major internal tube diameter that is less than (or possibly equal to) the pass through diameter. Various techniques, such as pilgering, rolling, forging, and hydroforming utilize a mandrel having an outer helical profile. The mandrel is inserted into a tube which is then formed over (about) the mandrel to create a helical profile on the inner surface of the tube. In techniques such as extrusion or drawing, the tube is drawn about a die that forms the inner profile. In electrochemical machining techniques, an electrode (also referred to in the art as a cathode) is first manufactured that has an external profile similar to the aforementioned die (or to the predetermined helical profile of the stator tube). This electrode is inserted into the tube and used to electrochemically machine an internal helical profile. In each of these manufacturing techniques, the mandrel, die, or electrode must be withdrawn from the tube after formation of the internal helical profile. In order to insert and/or remove the mandrel, die, or electrode from the tube, the pass through diameter in such prior art stators must be at least slightly greater than the major diameter of the mandrel, die, or electrode. This results in a stator tube having a major internal tube diameter that is less than the pass through diameter of the tube.

Figure 3:
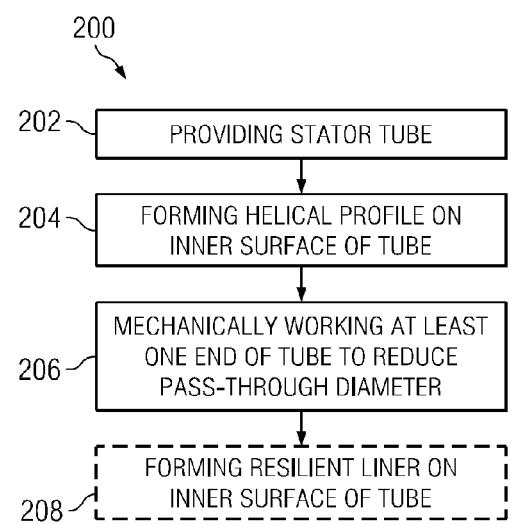
FIG. 3 depicts a flow chart of one exemplary method embodiment in accordance with the present disclosure for fabricating a stator having a major internal tube diameter greater than a pass through diameter.

With reference now to FIG. 3, one exemplary method embodiment 200 for fabricating a stator in accordance with the present disclosure is depicted in flow chart form. At 202 a stator tube is provided including at least one longitudinal end having an enlarged pass through diameter. By enlarged, it is meant that the pass through diameter of the longitudinal end of the tube is greater than a predetermined major internal tube diameter of the stator. A helical profile (including a plurality of internal helical lobes) may then be formed at 204 on an inner surface the tube using conventional techniques (e.g., a conventional electrochemical machining process) such that the major internal tube diameter is less than or equal to the enlarged pass through diameter.

At 206, the longitudinal end of the tube is reduced via mechanical working (e.g., via a hot or cold forging or swaging technique). This mechanical working reduces the pass through diameter of the tube end to a diameter that is less than the major internal tube diameter that was formed at 204. The mechanical working process may optionally further include one or more machining steps, for example, to provide a precisely dimensioned pass through diameter and/or to form internal threads. At 208 a resilient (e.g., elastomer) liner may be formed on the internal helical surface, e.g., using conventional injection molding techniques.

Figure 4A:
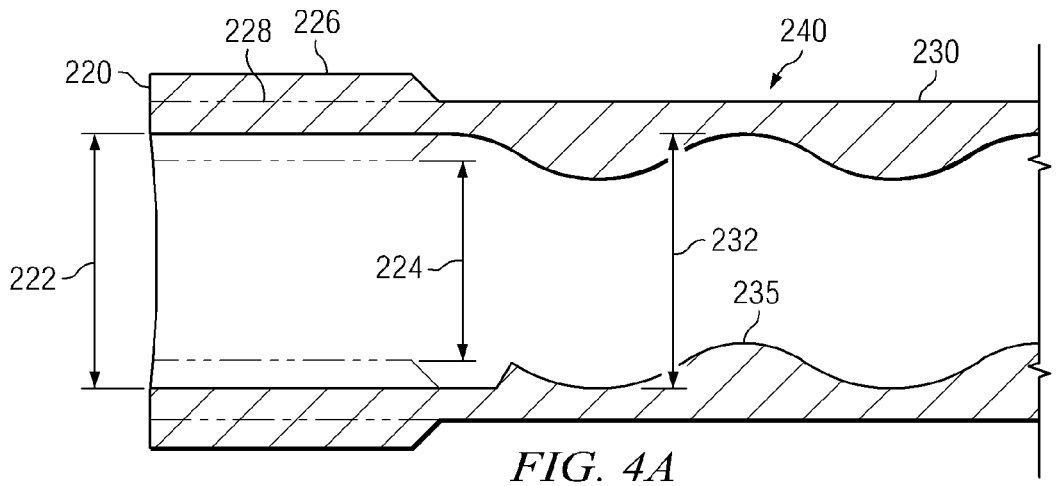
FIG. 4A depicts one exemplary stator tube formed by the method depicted in FIG. 3.

FIG. 4A depicts one exemplary stator tube embodiment 240 formed by method 200. Tube 240 includes a longitudinal end 220 having the aforementioned enlarged pass through diameter. Tube 240 also includes an upset 226 on its outer surface. As described above, the enlarged pass through diameter 222 enables a helical profile having a plurality of internal helical lobes 235 and a predetermined major internal tube diameter 232 to be formed. The mechanical working process reduces the inner and outer diameters of the tube so that the new pass through diameter 224 is less than the major internal tube diameter 232. As also depicted the mechanical working process preferably results in the outer surface 228 of longitudinal end 220 having the same diameter as the outer surface 230 of the remainder of the tube, although additional machining steps may also be utilized to achieve a uniform outer surface.

Figure 4B:
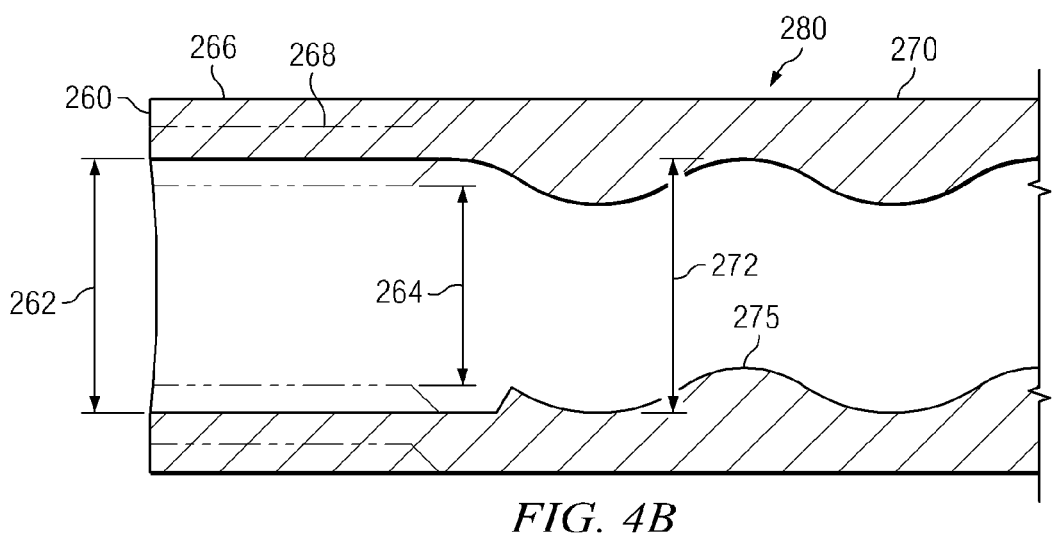
FIG. 4B depicts an alternative stator tube formed by the method depicted in FIG. 3.

FIG. 4B depicts an alternative stator tube embodiment 280 formed by method 200. Tube 280 also includes a longitudinal end 260 having the aforementioned enlarged pass through diameter 262 as well as an outer surface 270 (having an enlarged diameter). As described above, the enlarged pass through diameter 262 enables a helical profile having a plurality of internal helical lobes 275 and a predetermined major internal tube diameter 272 to be formed. The mechanical working process reduces the inner and outer diameters of the tube so that the new pass through diameter 264 is less than the major internal tube diameter 272. As also depicted the mechanical working process results in the outer surface 268 of longitudinal end 220 having a reduced diameter as compared with the outer surface 266 and 270 of the remainder of the tube. The diameter of surface 270 may optionally be reduced via further machining.

Figure 5:
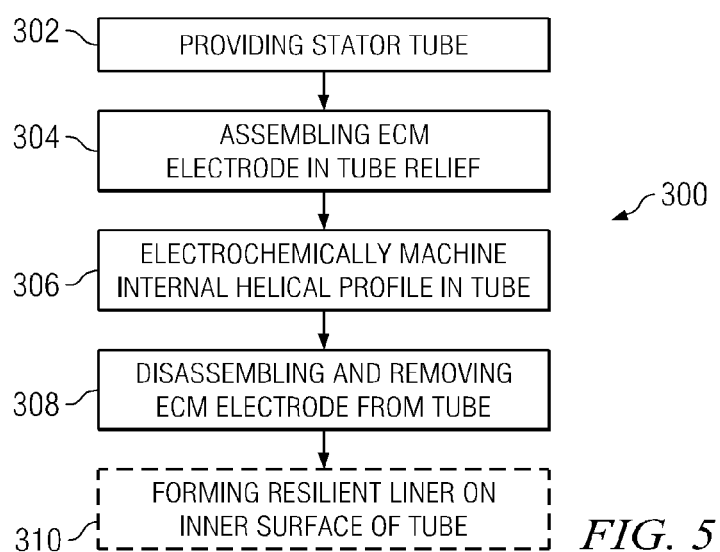
FIG. 5 depicts a flow chart of another exemplary method embodiment in accordance with the present disclosure for fabricating a stator having a major internal tube diameter greater than a pass through diameter.

Turning now to FIG. 5, an alternative method embodiment 300 for fabricating a stator in accordance with the present disclosure is depicted in flow chart form. At 302 a stator tube is provided. The stator tube includes at least one longitudinal end having a pass through diameter. The tube further includes an internal relief which has an inner diameter that is greater than the pass through diameter. At 304 an electrochemical machining electrode is assembled in the internal relief. The electrode includes a plurality of distinct work pieces, each of which has an outer diameter that is less than the pass through diameter. The work pieces may therefore be readily deployed in the tube and assembled into an electrochemical machining electrode defining a major helical diameter greater than the pass through diameter. At 306, the electrode is utilized to electrochemically machine an internal helical profile in the stator tube. As described above, the internal helical profile includes a plurality of helical lobes and a major internal tube diameter that is greater than the pass through diameter. The electrode is then disassembled and removed from the stator tube at 308. A resilient liner may be formed on the inner surface of the stator tube at 310.

Figure 6A:
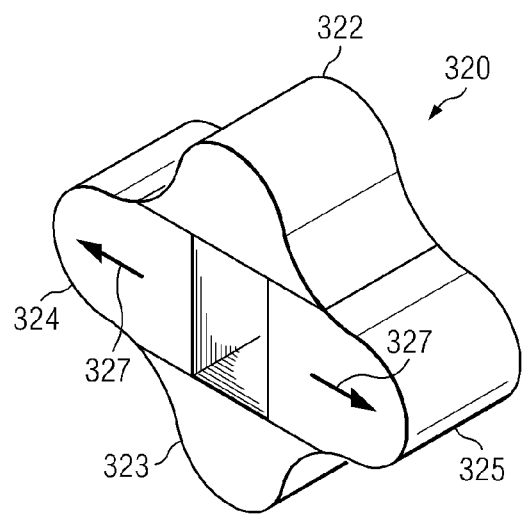
FIG. 6A depicts an exemplary multi-piece electrochemical machining electrode for use in the method embodiment depicted on FIG. 5.

FIG. 6A depicts an exemplary multi-piece electrochemical machining electrode 320 in accordance with the present disclosure. The exemplary electrode embodiment depicted includes four lobes formed from first, second, third, and fourth distinct work pieces 322, 323, 324, and 325, although it will be appreciated that the present disclosure is not limited to stators having any particular number of lobes or electrodes having any particular number of work pieces. When assembled and expanded as indicated at 327, the work pieces 322, 323, 324, and 325 form an electrode 320 having a helical profile formed on an outer surface thereof. The helical profile is dimensioned so as to form an internal helical profile in the stator tube upon electrochemical machining.

Figure 6B:
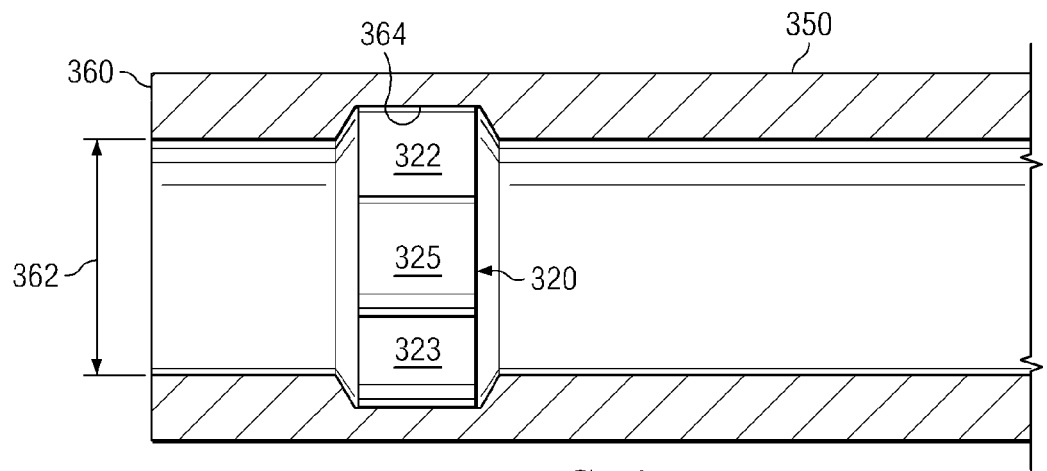
FIG. 6B depicts the electrode shown on FIG. 6A deployed in a stator tube.

FIG. 6B depicts electrode 320 assembled in a stator tube 350 prior to forming the internal helical profile (e.g., at the completion of step 304 of method embodiment 300). The stator tube 350 includes a longitudinal end 360 having a pass through diameter 362 and an internal relief 364. The electrode 320 is shown assembled in the relief 364. As depicted, the major diameter of the electrode 320 is greater than the pass through diameter 362.

Although the present disclosure and its advantages have been described in detail, it should be understood that various changes, substitutions and alternations can be made herein without departing from the spirit and scope of the invention as defined by the appended claims.

We claim:
1. A Moineau style stator comprising:
   an integral stator tube including a longitudinal end having a threaded box end defining an internal pass through diameter;
   the stator tube defining an internal helical cavity and further including a plurality of internal rigid helical lobes formed on an inner surface of the tube, the helical cavity having a major internal tube diameter that is greater than the pass through diameter of the longitudinal end; and a resilient liner deployed on an inner surface of the stator tube and presented to the helical cavity, wherein the resilient liner defines a major internal liner diameter that is less than the pass through diameter of the longitudinal end.

2. The stator of claim 1, wherein the stator tube includes a box end having internal threads, the pass through diameter of the stator tube being equal to the internal thread diameter of the box end.

3. The stator of claim 1 configured for use in a pump or in a power section.

4. A subterranean drilling motor comprising:

a rotor having a plurality of rotor lobes on a helical outer surface of the rotor;

a stator including an integral stator tube, the stator tube including a longitudinal end having a threaded box end defining an internal pass through diameter, the stator tube defining an internal helical cavity and further including a plurality of rigid helical lobes formed on an inner surface of the tube, the helical cavity having a major internal tube diameter that is greater than the pass through diameter of the longitudinal end, the stator further including a resilient liner deployed on an inner surface of the stator tube and presented to the internal helical cavity, the resilient liner defining a major internal liner diameter that is less than the pass through diameter of the longitudinal end; and the rotor deployable in the helical cavity of the stator tube such that an outer surface of the rotor is in a rotational interference fit with the resilient liner.

5. The stator tube of claim 4, wherein the stator tube includes a box end having internal threads, the pass through diameter of the stator tube being equal to the internal thread diameter of the box end.

* * * * *